(12) United States Patent
Wittel et al.

(10) Patent No.: US 8,356,076 B1
(45) Date of Patent: Jan. 15, 2013

(54) APPARATUS AND METHOD FOR PERFORMING SPAM DETECTION AND FILTERING USING AN IMAGE HISTORY TABLE

(75) Inventors: Greg Wittel, St. Louis, MO (US); Yanyan Yang, Sunnyvale, CA (US); Scott Panzer, Sunnyvale, CA (US); Steven Lewis, San Jose, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 301 days.

(21) Appl. No.: 11/700,467

(22) Filed: Jan. 30, 2007

(51) Int. Cl.
*G06F 15/16* (2006.01)
(52) U.S. Cl. ............. 709/206; 709/223; 382/190; 726/4
(58) Field of Classification Search .................. 709/206, 709/207, 223; 726/22, 26, 4; 382/190
See application file for complete search history.

(56) References Cited

U.S. PATENT DOCUMENTS

| | | | |
|---|---|---|---|
| 5,127,055 A | 6/1992 | Larkey | |
| 6,507,866 B1 | 1/2003 | Barchi | |
| 7,340,376 B2 | 3/2008 | Goodman | |
| 2002/0199095 A1 | 12/2002 | Bandini et al. | |
| 2004/0221062 A1* | 11/2004 | Starbuck et al. | 709/246 |
| 2004/0249895 A1* | 12/2004 | Way | 709/206 |
| 2004/0260922 A1 | 12/2004 | Goodman et al. | |
| 2005/0060643 A1 | 3/2005 | Glass | |
| 2005/0120019 A1 | 6/2005 | Rigoutsos et al. | |
| 2005/0193073 A1 | 9/2005 | Mehr et al. | |
| 2005/0262210 A1 | 11/2005 | Yu | |
| 2006/0047769 A1* | 3/2006 | Davis et al. | 709/207 |
| 2006/0095966 A1* | 5/2006 | Park | 726/22 |
| 2006/0149821 A1 | 7/2006 | Rajan et al. | |
| 2006/0168041 A1 | 7/2006 | Mishra et al. | |
| 2006/0277259 A1* | 12/2006 | Murphy et al. | 709/206 |
| 2007/0185963 A1* | 8/2007 | Stauffer | 709/207 |
| 2008/0004048 A1 | 1/2008 | Cai et al. | |
| 2008/0004049 A1* | 1/2008 | Yigang et al. | 455/466 |
| 2008/0021961 A1 | 1/2008 | Jhawar | |
| 2008/0059590 A1* | 3/2008 | Sarafijanovic et al. | 709/206 |
| 2008/0091765 A1* | 4/2008 | Gammage et al. | 709/202 |
| 2008/0114843 A1 | 5/2008 | Shinde et al. | |
| 2008/0127340 A1* | 5/2008 | Lee | 726/22 |
| 2008/0130998 A1* | 6/2008 | Maidment et al. | 382/181 |

(Continued)

OTHER PUBLICATIONS

Ian H. Witten and Eibe Frank (2005) "Data Mining: Practical machine learning tools and techniques", 2nd Edition, Morgan Kaufmann, San Francisco, 2005.

(Continued)

*Primary Examiner* — Oanh Duong
(74) *Attorney, Agent, or Firm* — Blakely, Sokoloff, Taylor & Zafman, LLP

(57) ABSTRACT

A system and method are described for using different types of image fingerprints to detect spam. Specifically, one embodiment of the invention dynamically calculates both an image-specific signature (e.g., MD5 checksum) and a generic signature for each image and, if a specified number of images have the same generic signature but different image-specific signatures, then a feature is fired within a spam engine to indicate that the images are spam. By way of example, a computer-implemented method is described for detecting spam images within a stream of messages comprising: generating generic signatures and image-specific signatures for images within the stream of messages; determining if two or more images with matching generic signatures have different image-specific signatures; and updating a spam filtering engine to include the matching generic signatures if the number of images with matching generic signatures but different image-specific signatures reach a specified threshold value.

20 Claims, 8 Drawing Sheets

U.S. PATENT DOCUMENTS

| | | | |
|---|---|---|---|
| 2008/0159632 A1* | 7/2008 | Oliver et al. | 382/209 |
| 2008/0178288 A1* | 7/2008 | Alperovitch et al. | 726/22 |
| 2009/0070872 A1 | 3/2009 | Cowings et al. | |
| 2009/0100523 A1* | 4/2009 | Harris | 726/26 |

OTHER PUBLICATIONS

J. Oliver. "Using lexigraphical distancing to block spam" in Presentation at MIT Spam Conference. Cambridge, MA. Jan. 21, 2005.

H. Lee and Andrew Y. Ng. "Spam Deobfuscation using a Hidden Markov Model". In web proceedings of Conference of Email and Anti-Spam, Palo Alto 2005.

R. Kohavi. "The power of decision tables" in European Conference on Machine Learning, 1995.

Hall, M., et al.,"Practical Feature Subset Selection for Machine Learning", pp. 11, 1998.

Fayyad, U. M., and Irani, K. B. 1993. Multi-interval discretization of continuous-valued attributes for classification learning. In Proceedings of the 13th Int. Joint Conference on Artificial Intelligence, 1022-1027 Morgan Kaufmann.

G. Rios and H. Zha. "Exploring SVM and Random Forest for Spam Detection", in web proceedings of Conference of Email and Anti-Spam, Palo Alto 2004.

V. Sharma, P. Sarda and S. Sharma. "An Add-on to Rule Based Sifters for Multi Recipient Spam Emails". NLDB 2005: 361-364.

John Graham-Cumming, "The Spammers' Compendium", Spam Conference 2003.

Online document "Guide to Weka", Mar. 15, 2005 at http://www.andy-roberts.net/teaching/db32/weka-db32.pdf.

Schwartz, R., "Finding Similar Images" Perl of Wisdom, Linux Magazine, Aug. 14, 2003, pp. 1-6; www.linux-mag.com/index2.php?option=com_content&task=view&id=1424&Itemid-221.

Office Action from U.S. Appl. No. 11/700,473, mailed Apr. 21, 2009, 12 pages.

Office Action from U.S. Appl. No. 11/444,543, mailed May 20, 2009, 12 pages.

Chapman, Sam, "A compilation of various string similarity metrics", http://www.dcs.shef.ac.uk/~sam/stringmetrics.html, copyright 2006., (2006), 15 pages.

Office Action from U.S. Appl. No. 11/444,593, mailed Sep. 15, 2009, 12 pgs.

"Proofpoint MLX Whitepaper", *Proofpoint MLX Machine Learning to Beat Spam Today and Tomorrow*, Copyright 2006., (2006), 28 pages.

Office Action from U.S. Appl. No. 11/444,543, mailed Feb. 25, 2010, 15 pages.

* cited by examiner

APPARATUS AND METHOD FOR PERFORMING SPAM DETECTION AND FILTERING USING AN IMAGE HISTORY TABLE

BACKGROUND

1. Field of the Invention

This invention relates to electronic message analysis and filtering. More particularly, the invention relates to a system and method for performing real-time message stream analysis on a series of email messages.

2. Description of the Related Art

"Spam" is commonly defined as unsolicited bulk e-mail, i.e., email that was not requested (unsolicited) and sent to multiple recipients (bulk). Although spam has been in existence for quite some time, the amount of spam transmitted over the Internet and corporate local area networks (LANs) has increased significantly in recent years. In addition, the techniques used by "spammers" (those who generate spam) have become more advanced in order to circumvent existing spam filtering products.

Spam represents more than a nuisance to corporate America. Significant costs are associated with spam including, for example, lost productivity and the additional hardware, software, and personnel required to combat the problem. In addition, many users are bothered by spam because it interferes with the amount of time they spend reading legitimate e-mail. Moreover, because spammers send spam indiscriminately, pornographic messages may show up in e-mail inboxes of workplaces and children—the latter being a crime in some jurisdictions. Recently, there has been a noticeable increase in spam advertising websites which contain child pornography. "Phishing" emails are another type of spam that request account numbers, credit card numbers and other personal information from the recipient.

1. Real-Time Spam Filtering

Various techniques currently exist for filtering spam. Specifically, FIG. 1 illustrates an exemplary spam filtering architecture which includes an email analyzer module 101, a mathematical model module 102 and a message processing module 103.

The email analyzer module 101 analyzes each incoming email message to determine whether the email message contains one spam-like "features." Features used in content-based spam filters can be divided into three basic categories:

(1) Header information: Features that describe the information path followed by a message from its origin to its destinations as well as Meta information such as date, subject, Mail Transfer Agents (MTA), Mail User Agents (MUA), content types, etc.

(2) Message body contents: Features that describe the text contained in the body of an email, such as words, phrases, obfuscations, URLs, etc.

(3) Meta features: Boolean combinations of other features used to improve accuracy Once the features of an email message have been identified, a mathematical model 102 is used to apply "weights" to each of the features. Features which are known to be a relatively better indicator of spam are given a relatively higher weight than other features. The feature weights are determined via "training" of classification algorithms such as Naïve Bayes, Logistic Regression, Neural Networks, etc. Exemplary training techniques are described below with respect to FIG. 2.

The combined weights are then used to arrive at a spam "score." If the score is above a specified threshold value, then the email is classified as spam and filtered out by message processing module 103. By contrast, if the score is below the specified value, then the spam processing module forwards the email on to a user's account to the email server 104.

2. Training

As mentioned above, the weights applied to features within the feature set are determined through a process known as "training." Different algorithms use different methods of weight calculation including maximum entropy, error backtracking, etc. The spam model is regularly trained in order to assign weights to newly extracted features and update the weights associated with older features. Regular training helps to keep the weights of features updated according to the latest spam techniques in use.

FIG. 2 illustrates an exemplary training scenario which employs machine learning, a training technique developed by the assignee of the present patent application. See, e.g., Proofpoint MLX Whitepaper (2005), currently available at www-.proofpoint.com. In this scenario, an email training corpus 200 containing known spam and ham messages is provided as a data source. A feature detection module 201 identifies features from the feature set within each email and provides this information to a machine learning module 202. The machine learning module 202 is also told whether each message is spam or ham. Using this information, the machine learning module 202 calculates a correlation between the features and spam messages, i.e., it determines how accurately certain features identify spam/ham. As mentioned above, various machine learning algorithms may be used such as Naïve Bayes, Logistic Regression, Neural Networks, etc.

The calculations performed by the machine learning module 202 are expressed in the form of a weight file 203 which associates a weight with each of the features in the feature set. For example, features which identify spam with relatively greater accuracy (e.g., "buy Viagra") are provided with relatively larger weights than other features (e.g., "visit online"). The weight file is subsequently used to perform spam filtering operations as described above.

Typically, the training process described above is performed periodically (e.g., once a day) at a central spam analysis facility and the results of the training process are pushed out to customer sites (i.e., sites where the spam engine shown in FIG. 1 is executed). Consequently, a delay may exist between the time a new spam campaign is initiated and the time the new definitions needed to identify the spam campaign are sent to the customer site. As such, new, more dynamic techniques for identifying spam campaigns in real-time (or near real-time) are needed.

SUMMARY

A system and method are described for using different types of image fingerprints to detect spam. Specifically, one embodiment of the invention dynamically calculates both an image-specific signature (e.g., MD5 checksum) and a generic signature for each image and, if a specified number of images have the same generic signature but different image-specific signatures, then a feature is fired within a spam engine to indicate that the images are spam. By way of example, a computer-implemented method is described for detecting spam images within a stream of messages comprising: generating generic signatures and image-specific signatures for images within the stream of messages; determining if two or more images with matching generic signatures have different image-specific signatures; and updating a spam filtering engine to include the matching generic signatures if the number of images with matching generic signatures but different image-specific signatures reach a specified threshold value.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

In contrast to prior systems, one embodiment of the invention employs pattern recognition and anomaly detection techniques to dynamically analyze streams of email messages. By analyzing message streams (rather than just individual messages), correlations between "spammy" messages may be determined and filtering decisions may be made independently of the training process described above. As a result, new spam campaigns may be identified more efficiently than in prior systems.

1. Architectural Overview

Figure 3A:
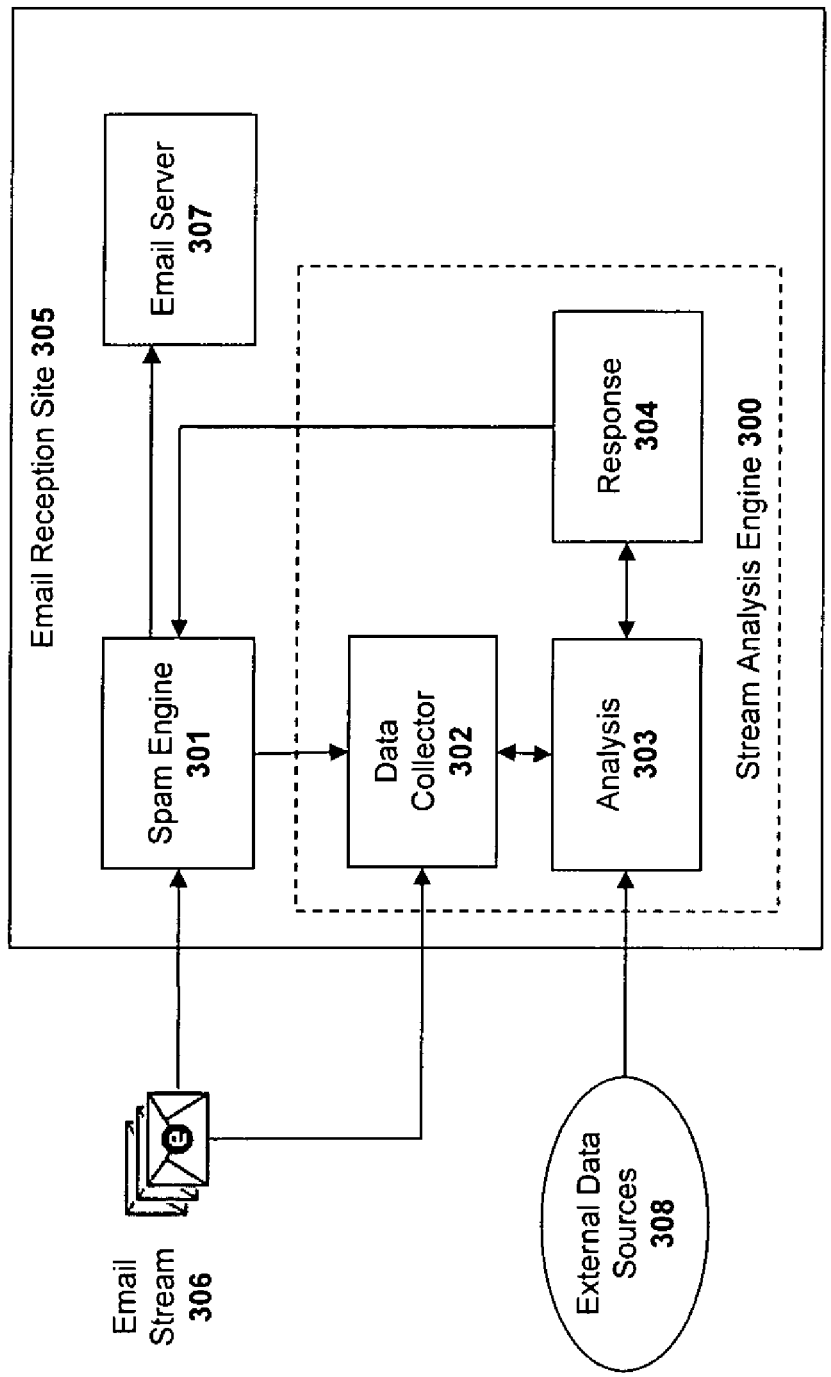
FIGS. 3a-b illustrates two stream analysis architectures according to two embodiment of the invention.

FIG. 3a illustrates one embodiment of a message stream analysis architecture which performs a correlative analysis on a message stream dataset and takes appropriate actions based on the results of the analysis. As illustrated, this embodiment includes a stream analysis engine 300 comprised of a data collector module 302 for collecting certain types of data from incoming email message streams 306; a statistical analysis module 303 for performing a correlative analysis on the collected data; and a response module 304 for specifying one or more actions to be performed in response to the analysis. The functions performed by each of these modules are described in greater detail below.

Figure 1:
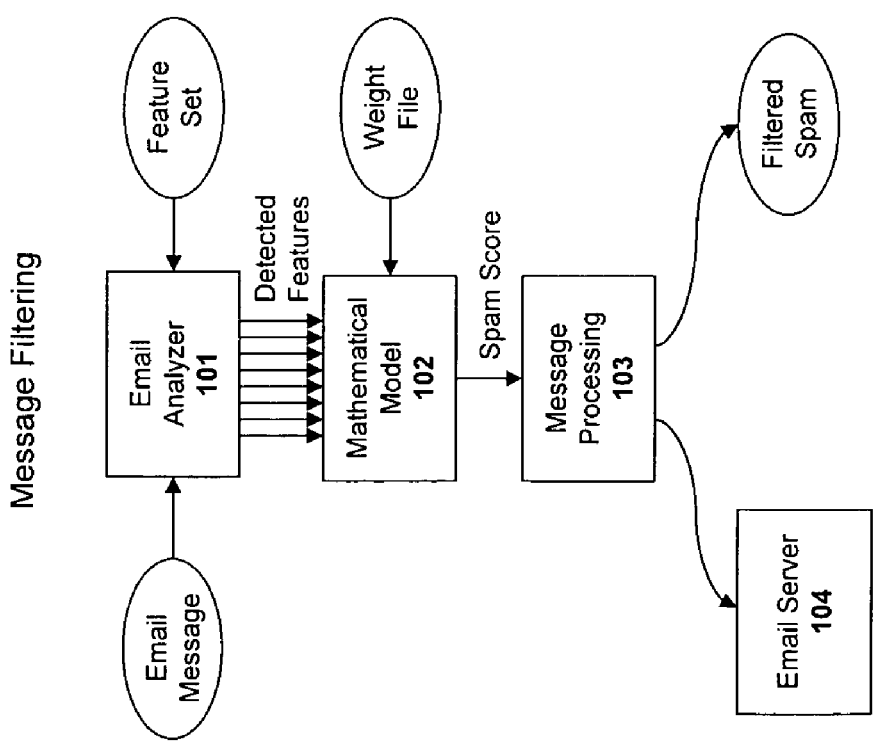
FIG. 1 illustrates an architecture of an exemplary prior art email filtering system.

Also illustrated in FIG. 3a is a spam engine 301 which, in one embodiment, includes spam filtering components similar to those described above with respect to FIG. 1. For example, the spam engine 301 receives periodic updates of features and associated weights (typically referred to as spam "definitions"); analyzes incoming messages based on the features and weights to arrive at a spam "score"; and filters messages accordingly. Messages which are not identified as spam are forwarded to an email server 307 while messages identified as spam are removed from the email stream 306.

Turning now to the stream analysis engine 300, the data collector module 302 extracts data from messages in the incoming email stream 306. By way of example, in one embodiment of the invention, the data collector module 302 extracts uniform resource locators (URLs) embedded within the message stream and/or connection-level data associated with each of the messages (e.g., IP addresses or IP address blocks from which the messages originated). In addition, in one embodiment, the data collector module 302 extracts certain types of images from the email message stream such as JPEG images and GIF images. The extracted information is then provided to the statistical analysis module 303 for analysis.

The statistical analysis module 303 evaluates the raw data extracted by the data collection module 302 to determine whether particular groups of messages represent new spam campaigns. In particular, the statistical analysis module 303 searches for recurring patterns spread across a series of email messages within a specified window of time (e.g., 3 hours). In one embodiment, the statistical analysis module 303 also analyzes data provided from external data sources 308 including, for example, data collected from other email reception sites and/or spam analysis sites (see, e.g., FIG. 3b and the associated description below).

If the statistical analysis module 303 determines that a particular pattern represents spam, the response module 304 takes an appropriate response. In one embodiment, the response module 304 dynamically incorporates the pattern (or a "fuzzy" representation of the pattern) into the feature set employed by the spam engine 301. If the pattern is already included in the feature set, the response module 304 may dynamically increase the weight associated with that feature. Alternatively, or in addition, the response module 304 may dynamically fire special rules to cause the spam engine 301 to search for the detected pattern. For example, when a special pattern is detected the weight of the feature, X, associated with the pattern may be increased. In addition to the default feature, X, associated with the pattern, an additional feature, Y, may also be fired. By way of example, if a particular pattern is detected A times, then feature X is fired. If the pattern is detected B times, then feature Y is fired, or combination of X and Y. This allows separate occurrences of a particular pattern to be differentiated (for example, a pattern may be differentiated as "suspicious," but not extremely suspicious).

Figure 2:
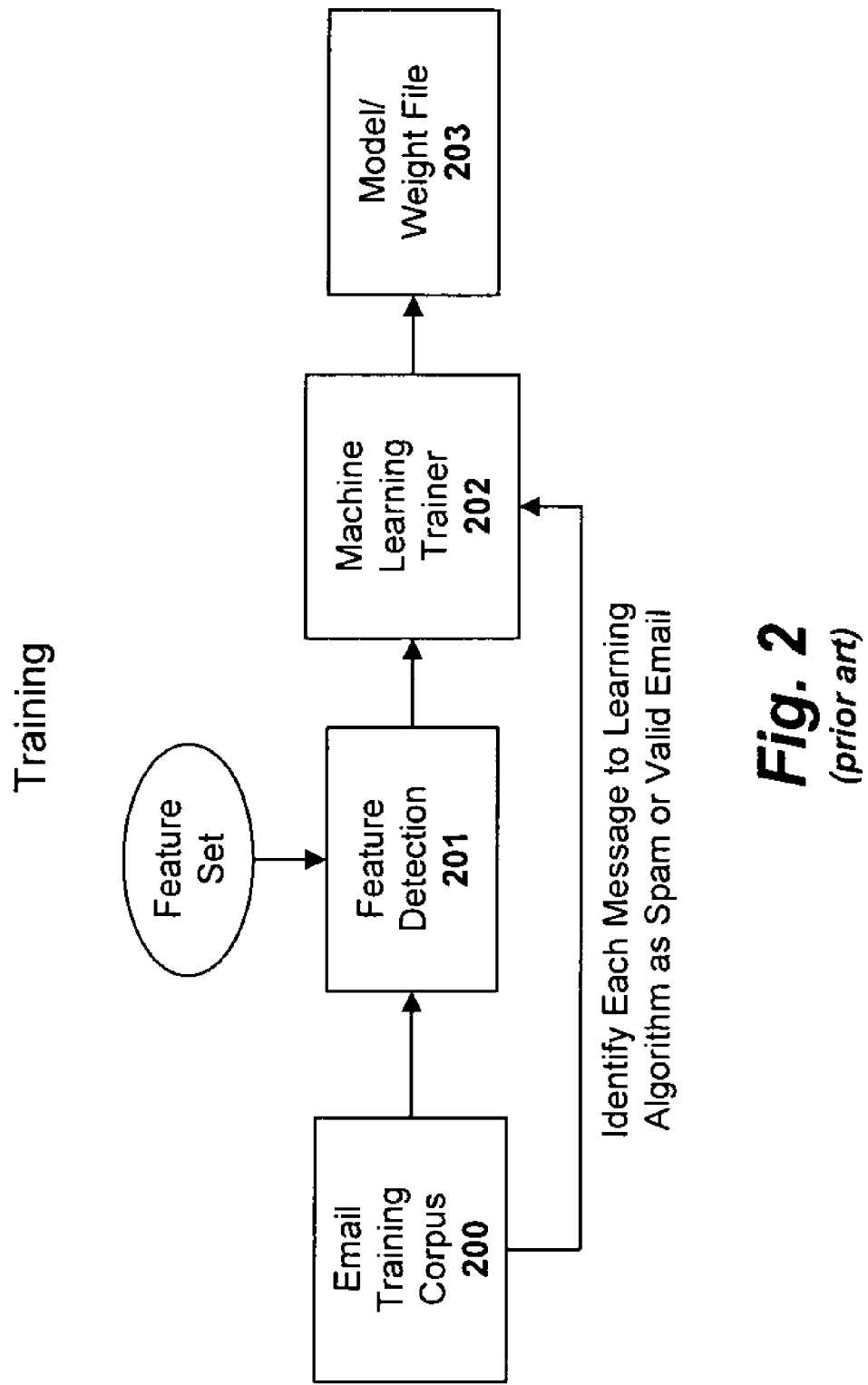
FIG. 2 illustrates an exemplary architecture for training using machine learning techniques.
Figure 3B:
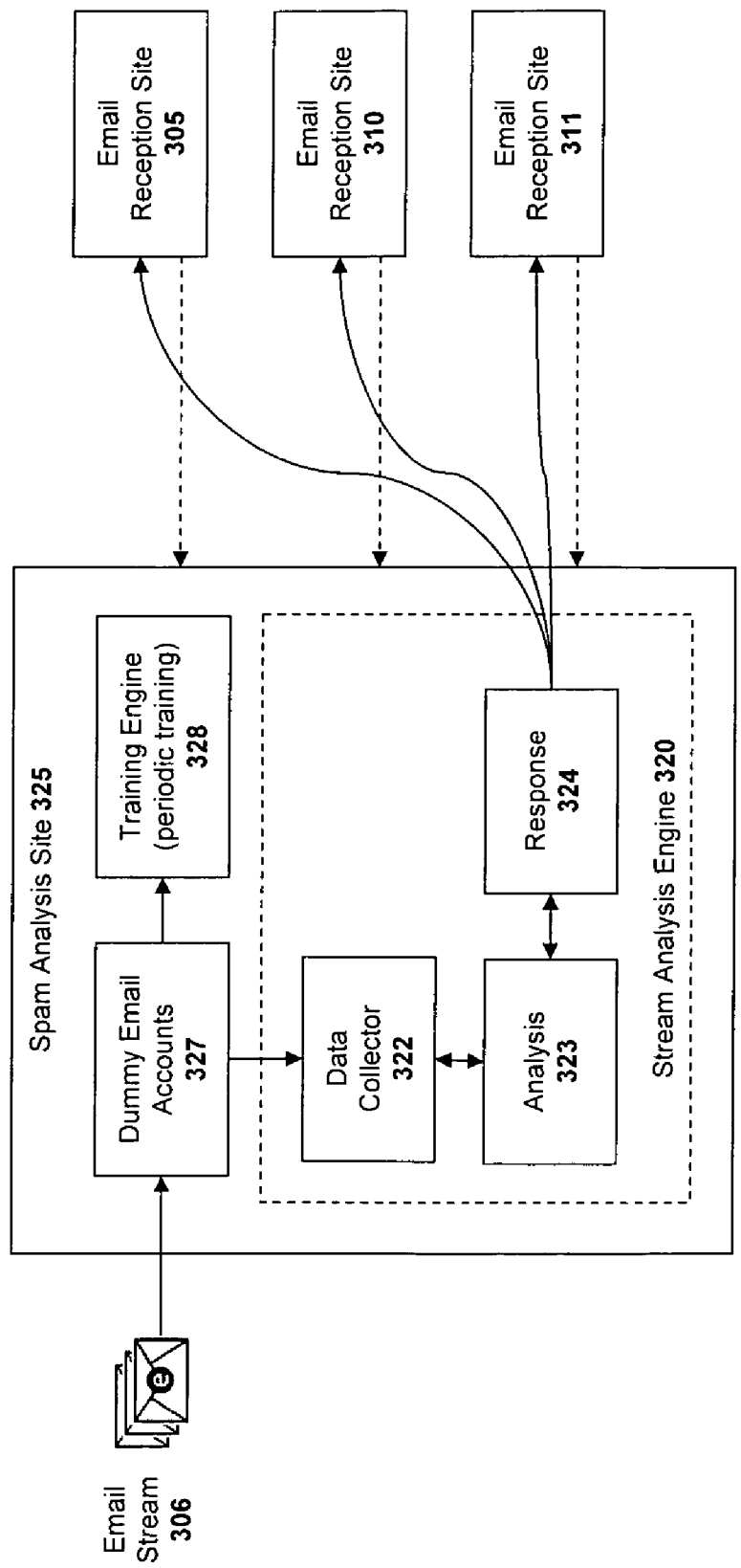

Rather than dynamically gathering data from email streams at a single site as shown in FIG. 3a, one embodiment of the invention dynamically shares data across multiple sites. FIG. 3b, for example, illustrates three email reception sites 305 (from FIG. 3a), 310 and 311 communicatively coupled to a spam analysis site 325. Unlike the email reception sites 305, 310 and 311, which typically include real organizational email accounts, the purpose of the spam analysis site 325 is to analyze spam and communicate updates to the spam engines at each of the email reception sites 305, 310, 311. For example, a training engine 328 at the spam analysis site 325 may perform the periodic training operations as described above with respect to FIG. 2. The spam analysis site 325 may include a plurality of "dummy" email accounts 327 specifically designed to attract spam email (i.e., email accounts set up exclusively for the purpose of gathering spam for analysis). One specific example of a spam analysis site is the "Proofpoint Attack Response Center" currently implemented by the assignee of the present application (see, e.g., Proofpoint MLX Whitepaper (2005)).

As illustrated in FIG. 3b, in one embodiment of the invention, the spam analysis site 325 also includes a stream analysis engine 320 including a data collector module 322, a statistical analysis module 323 and a response module 324 to perform the dynamic stream analysis techniques described herein. Consequently, once a new spam campaign has been positively identified within one of the email reception sites 305, 310, 311 and/or the spam analysis site 325, dynamic updates may be provided to the spam engines at each of the email reception sites from the spam analysis site 325 as indicated in FIG. 3*b*.

Although the remainder of this detailed description will focus on a single stream analysis engine 300 at a single email reception site 305, the underlying principles of the invention may also be implemented on a distributed architecture such as the one illustrated in FIG. 3*b*.

Various specific message analysis techniques and associated responses will now be described. It should be noted that, however, the underlying principles of the invention are not limited to these specific examples.

2. Dynamic Message Stream Analysis

As mentioned above, in one embodiment of the invention, the data collector module 302 extracts URLs from the stream of incoming email messages 306 and provides the URLs to the statistical analysis module 303 for evaluation. If a specified number of email messages contain the same URL within a specified period of time (e.g., 3 hours), then the response module 304 dynamically updates the spam engine so that the URL is identified as potential spam. For example, the response module 304 may update/create a feature associated with the URL within the spam engine and/or adjust a weight associated with the URL based on the frequency with which the URL is identified in the message stream.

In addition to URLs, in one embodiment, connection-level data such as the source IP addresses of messages within the message stream are extracted by the data collector module 302 and provided to the statistical analysis module 303 for evaluation. If a particular number of email messages have the same source IP address over a specified period of time (e.g., 3 hours), then the response module 304 dynamically updates the spam engine so that messages sent from the source IP address are identified as potential spam. As with the URL embodiments described above, the response module 304 may update/create a feature for the source IP address within the spam engine and/or adjust a weight associated with the source IP address based on the frequency with which messages are received from the source IP address.

In one embodiment, IP addresses and/or IP address blocks are extracted from the dummy email accounts 327 on the spam analysis site 325. Based on criteria such as frequency, spam distribution, and source, these IP addresses are added to the 'bad IP' datasets at the spam engines at each of the email reception sites 305, 310, 311, either dynamically or as part of the periodic spam definitions updates provided by the spam analysis site 325. In one embodiment, a severity level is assigned to the IP addresses based upon thresholds in the selection criteria. The severity level may represent the weight assigned to the IP address. That is, an IP that appears more likely to be a spam source based on the analysis can be given a stronger weight than one that appears to be less suspicious.

Thus, the analysis may be based on frequency (how often a particular IP address is detected), source (the addresses themselves), and spam distribution. Spam distribution refers to the content of the messages sent by each IP address. For example, of the message sent by each IP, if A sent 50% spam, and B sent 95% spam then this indicates that B is a more "spammy" IP address than A.

In one embodiment, the URL address and IP address are combined as part of the analysis by the statistical analysis module 303. For example, if a number of different URLs share the same IP address, then the statistical analysis module 303 may determine that this represents a new spam campaign and trigger the response module 304 accordingly (e.g., to dynamically update the spam engine). Blocks of IP address may also be used to make this determination. For example, if a series of URLs are received from IP addresses within a particular IP block, then the statistical analysis module 303 may identify this as a spam campaign. For example, if a set of URLs point to the same IP address (or block of addresses) then the statistical analysis module 303 characterizes the URLs as being more "spammy."

In addition, in one embodiment, the URLs and IP addresses/address blocks are compared against external sources 308 to determine whether they represent a new spam campaign. For example, in one embodiment, the URLs and/or IP addresses may be compared against known public blacklists maintained by anti-spam organizations (which contain lists of known bad IP addresses and bad URLs).

Figure 4:
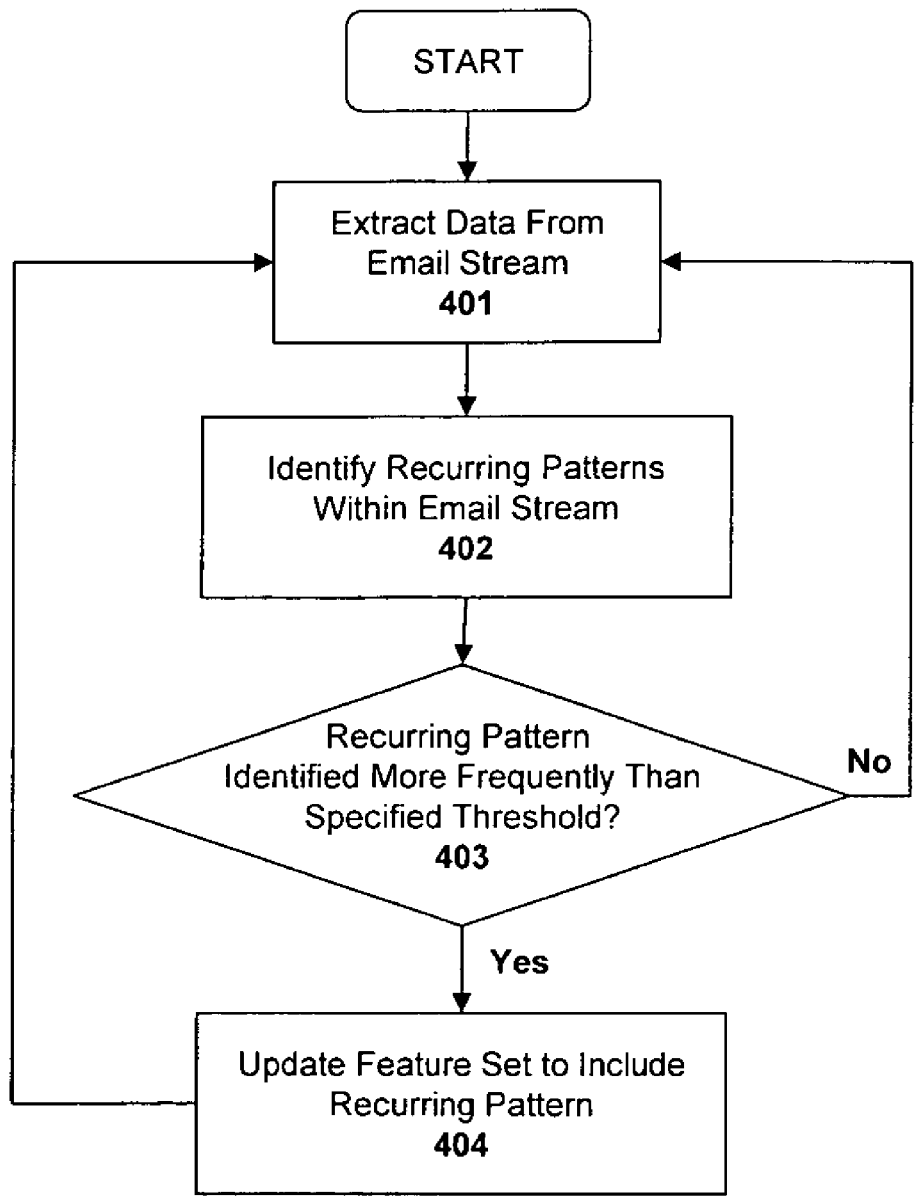
FIG. 4 illustrates a method for identifying any recurring pattern within a stream of email messages.

The underlying principles of the invention are not limited to the specific examples provided above (which focus on URLs and IP addresses). A more generalized method for identifying any recurring pattern within a stream of email messages is illustrated in FIG. 4. At 401, data is collected from the incoming email stream (e.g., by the data collector module 302). At 402, recurring patterns within the email message stream are identified. The patterns may be stored within a list, table or other type of data structure. As described below with respect to the image processing embodiments (e.g., FIGS. 5-6), an aging process may be employed so that patterns which have not been identified in successive email messages over a specified period of time are removed as candidates from the list. Moreover, the pattern may be an exact image signature or a fuzzy signature.

At 403, if a recurring pattern is identified a number of times above a specified threshold value, then the feature set of the current spam filter is dynamically updated at 404 (e.g., by adding a new feature, modifying the weight of a relevant feature, firing a special rule, etc). As illustrated in FIG. 4, in one embodiment, the process runs continuously while the stream analysis engine 300 is enabled.

3. Dynamic Image Analysis

Because spammers obfuscate images by adding random data within the body of the image, images with different image-specific signatures (e.g., MD5 checksums) but the same generic signatures have a relatively high likelihood of being spam. Accordingly, one embodiment of the invention dynamically calculates both the image-specific signature and a generic signature for each image and, if a specified number of images have the same generic signature but different image-specific signatures, then a feature is fired within a spam engine to indicate that images with this generic signature may be spam.

In operation, the data collector module 302 extracts images having certain specified characteristics from email message streams. For example, the data collector module 302 may extract only certain types of images which are known to be used for spam (e.g., GIF, JPEG). In addition, in one embodiment, the data collector module 302 extracts images which are above a minimum height, width and/or size threshold (i.e., because very small non-spam images may have the same generic signature) and below a maximum height, width and/or size threshold (i.e., because spam images are typically relatively small). Various different thresholds may be specified while still complying with the underlying principles of the invention (e.g., width/height>10 pixels; file size>=1024 bytes; width/height: >=100 pixels; file size<=120 kbytes, etc).

The statistical analysis module 303 includes image analysis logic for processing the images extracted by the data collector module. Specifically, in one embodiment, the statistical analysis module 303 includes the image analysis logic described in the co-pending patent application entitled APPARATUS AND METHOD FOR DETECTING IMAGES WITHIN SPAM (hereinafter "Image Processing Application") which is assigned to the assignee of the present application and which is incorporated herein by reference. The Image Processing Application describes techniques for generating a generic image signature referred to as a "Fuzzy" image signature. Briefly, to generate the Fuzzy image signature, an image is down-converted to an image size of 4×4 pixels, resulting in a generic signature of a vector of 48 numbers (i.e., 16 red, 16 blue, and 16 green). Two fuzzy image signatures are determined to be a match if the absolute differences between the numbers of the two vectors are cumulatively below a specified threshold. In addition, the Image Processing Application describes using image width and/or image type as a key to a series of MD5 hash tables containing MD5 fingerprints for GIF and JPEG images.

Figure 5:
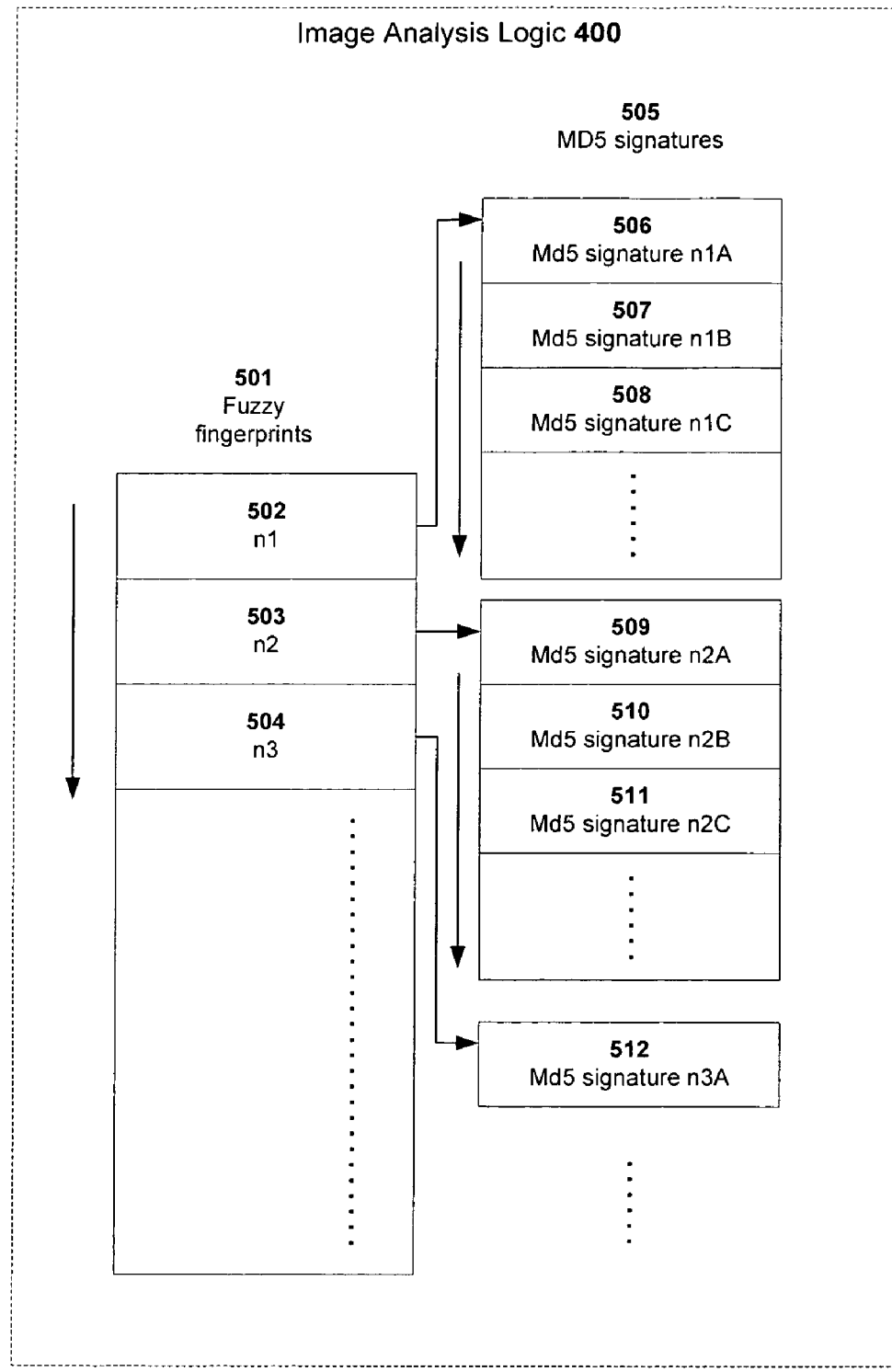
FIG. 5 illustrates a lookup history table employed in one embodiment of the invention.

In one embodiment of the invention, the image analysis logic of the statistical analysis module 303 generates both the fuzzy signature and the MD5 checksum for each image extracted by the data collector module 302. As illustrated in FIG. 5, in this embodiment, the image analysis logic 500 maintains a lookup history table 501 containing fuzzy fingerprints 502-504 generated from images over a period of time and a table 505 (or series of tables) containing MD5 signatures which correspond to each fuzzy fingerprint. In the specific example illustrated in FIG. 5, fuzzy fingerprint n1 502 is associated with MD5 signatures n1A, n1B, and n1C (506, 507 and 508, respectively); fuzzy fingerprint n2 503 is associated with MD5 signatures n2A, n2B, and n2C (509, 510 and 511, respectively); and fuzzy fingerprint n3 504 is associated with MD5 signature n3A (512). Because fuzzy fingerprints 502 and 503 are each associated with multiple MD5 fingerprints, the images from which the fingerprints were generated are spam candidates (i.e., because this indicates that the images have been obfuscated with random data).

In one embodiment, if the number of MD5 signatures which correspond to a particular fuzzy fingerprint are above a specified threshold value, the response module 304 dynamically adds the fuzzy fingerprint as a feature to the spam engine 301. In addition, after adding the feature to the spam engine 301, the response module 304 may dynamically increase the weight associated with the feature based on the number of additional MD5 hashes associated with the fuzzy fingerprint (i.e., because the larger the number, the more likely that the fuzzy signature identifies the image as spam).

In addition, in one embodiment of the invention, the image analysis component of the statistical analysis module 303 implements an aging process to remove fuzzy fingerprint entries. For example, if the number of MD5 signatures associated with a fuzzy fingerprint is below a specified threshold value (e.g., one MD5 signature) over a specified time period (e.g., 3 hours), then the statistical analysis module 303 will remove that particular fuzzy fingerprint from the lookup table 501, thereby freeing space. In addition, in one embodiment, the statistical analysis module 303 manages the lookup table by setting a maximum table size. When the maximum size is reached, older values which have not recently been associated with new MD5 signatures are removed. Various other aging techniques may be employed while still complying with the underlying principles of the invention.

Figure 6:
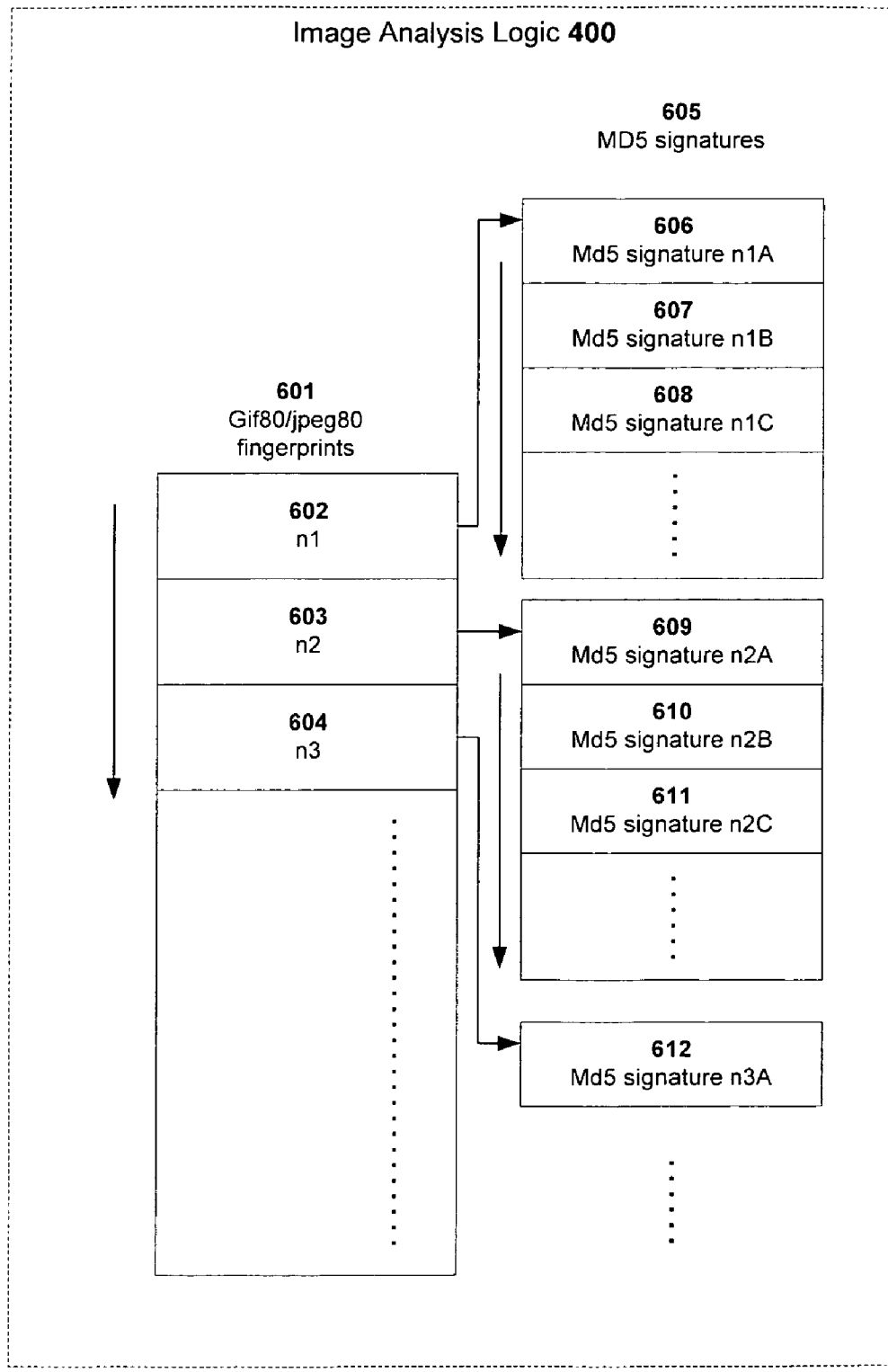
FIG. 6 illustrates a lookup history table employed in one embodiment of the invention which uses GIF80 and/or JPEG 80 fingerprints.

FIG. 6 illustrates one embodiment of the invention which operates in a similar manner to the embodiment shown in FIG. 5 but which uses a lookup history table 601 comprised of the GIF80 and/or JPEG 80 fingerprints 602-604 described in the Image Processing Application. As described in the Image Processing Application, the GIF80 and JPEG80 detection algorithms use image width and/or compression type as keys to an MD5 signature table. The entries of history table 601 are gif80 or jpeg80 fingerprints. For example, in FIG. 6, gif80/jpeg80 fingerprint n1 602 is associated with MD5 signatures n1A, n1B, and n1C (606, 607 and 608, respectively); gif80/jpeg80 fingerprint n2 603 is associated with MD5 signatures n2A, n2B, and n2C (609, 610 and 611, respectively); and gif80/jpeg80 fingerprint n3 604 is associated with MD5 signature n3A (612). Because gif80/jpeg fingerprints 602 and 603 are each associated with multiple MD5 fingerprints, the images from which the fingerprints were generated are spam candidates (i.e., because this indicates that the images have been obfuscated with random data).

One embodiment of the statistical analysis module concurrently supports both the embodiment shown in FIG. 5 and the embodiment shown in FIG. 6. For example, as described in the Image Processing Application, the embodiment shown in FIG. 5 may be used for processing uncorrupted images and the embodiment shown in FIG. 6 may be used for processing corrupted images.

4. Optical Character Recognition (OCR) Techniques

Spammers commonly generate images containing text to avoid detection by text-based spam filters. One embodiment of the invention employs Optical Character Recognition (OCR) in conjunction with image signature generation to address these types of obfuscation techniques. Specifically, OCR is used to identify the text within each image. A determination is then made as to whether the text within the image is actually spam and, if so, the exact image signature and/or a fuzzy fingerprint of the image is added to the spam definitions.

Figure 7:
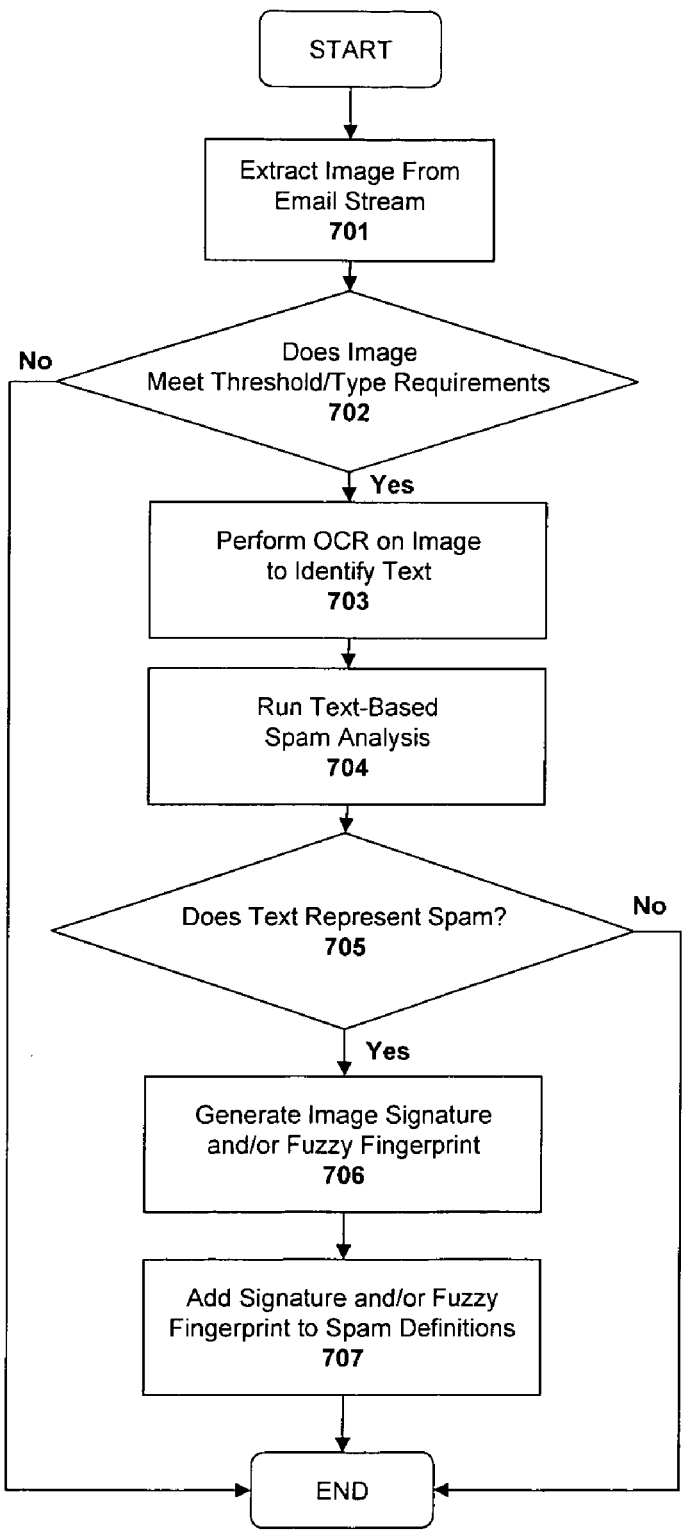
FIG. 7 illustrates a method for using optical character recognition techniques within a spam detection architecture.

FIG. 7 illustrates a method according to one embodiment of the invention. At 701, an image is extracted from a message within the email stream. At 702, a determination is made as to whether the image meets certain threshold and/or image type requirements. For example, in one embodiment, only images with a width, length and/or size above a specified minimum but below a specified maximum threshold are selected as candidates for further analysis. Similarly, only certain image types may be selected (e.g., GIF, JPEG).

If the image meets the threshold and image type requirements, then at 703, optical character recognition is performed on the image to identify text within the image (if any). Techniques for performing OCR on images are well known. In some cases, the images must initially be decoded/decompressed prior to running them through the OCR engine.

Once text has been extracted from the image, the text is analyzed to determine if it represents spam. For example, it may be compared against various known spam messages (e.g., Viagra). In addition, various known obfuscation detection techniques may be used to identify text which has been obfuscated (e.g., Viagra). For example, in one embodiment, the techniques described in co-pending application entitled APPARATUS AND METHOD FOR OBFUSCATION DETECTION WITHIN A SPAM FILTERING MODEL, Filed May 31, 2006, Ser. No. 11/444,543, are employed. This application is assigned to the assignee of the present application and is incorporated herein by reference.

At 705, if the text within the image is determined to be spam, then at 706 an image signature (e.g., an MD5 signature) and/or fuzzy fingerprint are generated for the image. In one embodiment, the same techniques as those described in the Image Processing Application are employed to generate the image signature and/or fuzzy fingerprint. Finally, at 707, the new image signature and/or fuzzy fingerprint are added to the spam definitions within the spam engine 301.

In one embodiment, the method illustrated in FIG. 7 is implemented on the stream analysis engine 320 on the spam analysis site 325. The new image signatures/fuzzy fingerprints are then dynamically transmitted from the spam analysis site 325 to each of the email reception sites 305, 310, 311. Alternatively, or in addition, the method illustrated in FIG. 7 may be implemented on the stream analysis engines 300 at each of the email reception sites 305, 310, 311. The new image signatures/fuzzy fingerprints may then be shared with each of the other email reception sites via the spam analysis site 325. Of course, the underlying principles of the invention are not limited to any specific network architecture.

Embodiments of the invention may include various steps as set forth above. The steps may be embodied in machine-executable instructions which cause a general-purpose or special-purpose computer processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments of the invention described above focus on detecting spam email messages, the underlying principles of the invention may be employed in a variety of other fields including spam web page detection and spam instant message detection. Moreover, it should be noted that the underlying principles of the invention may be implemented within virtually any type of computing platform including standard personal computer configurations and server configurations.

Accordingly, the scope and spirit of the invention should be judged in terms of the claims which follow.

What is claimed is:

1. A computer-implemented method for detecting spam images within a stream of messages comprising:
    extracting email messages having images with specified characteristics from the stream and performing the following operations only for those email messages:
    generating a generic signature and an image-specific signature for a first images within the stream messages;
    determining if the generic signature of the first image matches a generic signature of a second image;
    determining if the first and second images with matching generic signatures have different image-specific signatures; and
    including the matching generic signatures of the first and second images and one or more additional images in a spam filtering engine if a number of images with matching generic signatures but different image-specific signatures including the first and second images reaches a specified threshold value.

2. The method as in claim 1 wherein the generic signatures are stored in a lookup table, wherein each entry in the lookup table points to a table containing one or more of the image-specific signatures.

3. The method as in claim 1 wherein the generic signatures comprise down-converted representations of portions of the images.

4. The method as in claim 1 wherein the image-specific signatures comprise MD5 signatures.

5. The method as in claim 1 wherein if the number of images with the matching generic signatures but different image-specific signatures reaches a second specified threshold, then increasing a weight associated with the matching generic signatures within the spam filtering engine.

6. The method as in claim 1 wherein the specified threshold comprises two image-specific signatures for the matched generic signature.

7. The method as in claim 1 wherein each of the generic signatures are represented by a vector and wherein a match between two generic signatures is determined if absolute differences between values of the two vectors are cumulatively below a specified threshold.

8. The method as in claim 1 wherein the operations of generating and determining are performed at a spam analysis site and wherein the spam filtering engine is updated at a spam reception site.

9. A system for detecting spam images within a stream of messages, the system comprising a memory for storing program code and a processor for processing code to perform the operations of:
    extracting email messages having images with specified characteristics from the stream and performing the following operations only for those email messages:
    generating a generic signature and an image-specific signature for a first images within the stream of messages;
    determining if the generic signature of the first image matches a generic signature of a second image;
    determining if the first and second images with matching generic signatures have different image-specific signatures; and
    including the matching generic signatures of the first and second images and one or more additional images in a spam filtering engine if a number of images with matching generic signatures but different image-specific signatures including the first and second images reaches a specified threshold value.

10. The system as in claim 9 further comprising:
    a lookup table to store the generic signatures, wherein each entry in the lookup table points to a table containing one or more of the image-specific signatures.

11. The system as in claim 9 wherein the generic signatures comprise down-converted representations of portions of the images.

12. The system as in claim 9 wherein the image-specific signatures comprise MD5 signatures.

13. The system as in claim 9 wherein if the number of images with the matching generic signatures but different image-specific signatures reaches a second specified threshold, then the program code performs the additional operation of increasing a weight associated with the matching generic signatures within the spam filtering engine.

14. The system as in claim 9 wherein the specified threshold comprises two image-specific signatures for the matched generic signature.

15. The system as in claim 9 wherein each of the generic signatures are represented by a vector and wherein a match between two generic signatures is determined if absolute differences between values of the two vectors are cumulatively below a specified threshold.

16. The system for system as in claim 9 wherein the program code for generating generic signatures and image-specific signatures for images within the stream of messages and determining if two or more of the images with matching generic signatures have different image-specific signatures is implemented at a spam analysis site and the spam filter is implemented at an email reception site.

17. A non-transitory machine-readable medium having stored thereon sequences of instructions which, when executed by a machine, causes the machine to perform the operations of:
    extracting email messages having images with specified characteristics from the stream and performing the following operations only for those email messages:
    generating a generic signature and an image-specific signature for a first images within the stream of messages;
    determining if the generic signature of the first image matches a generic signature of a second image;
    determining if the first and second images with matching generic signatures have different image-specific signatures; and
    including the matching generic signatures of the first and second images and one or more additional images in a spam filtering engine if a number of images with matching generic signatures but different image-specific signatures including the first and second images reaches a specified threshold value.

18. The machine-readable medium as in claim 17 wherein the generic signatures are stored in a lookup table, wherein each entry in the lookup table points to a table containing one or more of the image-specific signatures.

19. The machine-readable medium as in claim 17 wherein the generic signatures comprise down-converted representations of portions of the images.

20. The machine-readable medium as in claim 17 wherein the image-specific signatures comprise MD5 signatures.

* * * * *